United States Patent
Kangarakis et al.

(10) Patent No.: US 9,161,409 B2
(45) Date of Patent: Oct. 13, 2015

(54) ILLUMINATION APPARATUS AND METHOD FOR OPERATING THE ILLUMINATION APPARATUS IN A DIM MODE

(71) Applicant: DIEHL AEROSPACE GMBH, Ueberlingen (DE)

(72) Inventors: Nicolaus Kangarakis, Nuremberg (DE); Steffen Bachmaier, Nuremberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 178 days.

(21) Appl. No.: 13/901,171

(22) Filed: May 23, 2013

(65) Prior Publication Data

US 2014/0001953 A1 Jan. 2, 2014

(30) Foreign Application Priority Data

Jun. 29, 2012 (DE) .................. 10 2012 013 039

(51) Int. Cl.
*B64D 47/02* (2006.01)
*H05B 33/08* (2006.01)
*B60Q 3/02* (2006.01)

(52) U.S. Cl.
CPC .......... *H05B 33/0845* (2013.01); *B60Q 3/0256* (2013.01); *B60Q 3/0259* (2013.01); *B60Q 3/0289* (2013.01); *B64D 47/02* (2013.01); *B64D 2203/00* (2013.01)

(58) Field of Classification Search
CPC ............. H05B 33/0845; B60Q 3/0259; B60Q 3/0256; B60Q 3/025; B60Q 3/0253; B60Q 3/0283; B60Q 3/0289; B64D 47/02; B64D 2203/00
See application file for complete search history.

(56) References Cited

U.S. PATENT DOCUMENTS

| | | | |
|---|---|---|---|
| 2011/0001433 A1* | 1/2011 | Lee et al. | 315/185 R |
| 2011/0141090 A1 | 6/2011 | Hong et al. | |
| 2011/0260644 A1* | 10/2011 | Lee et al. | 315/294 |
| 2012/0104964 A1* | 5/2012 | Hughes | 315/291 |
| 2012/0236373 A1* | 9/2012 | Oyama | 358/475 |
| 2012/0306392 A1* | 12/2012 | Young et al. | 315/192 |

FOREIGN PATENT DOCUMENTS

DE 202005020801 U1 10/2006

* cited by examiner

*Primary Examiner* — Jung Kim
(74) *Attorney, Agent, or Firm* — Scully, Scott, Murphy & Presser, P.C.

(57) ABSTRACT

An illumination apparatus having a first illumination unit and a second illumination unit is provided. Each illumination unit has an LED arrangement and a supply device. Each LED arrangement has at least one LED group having a multiplicity of LEDs. A control device for driving the at least two illumination units with a common nominal dim drive value is included. The nominal dim drive value drives the illumination units in such a way that the similar LED groups of the illumination units are operated in a dim mode. The apparatus also has an offset device, which is formed to derive an absolute dim drive value for each of the similar LED groups from the nominal dim drive value with an offset value. The offset value is selectively assigned to the LED group and selected, such that the LED group is activated by the absolute dim drive value.

10 Claims, 5 Drawing Sheets

US 9,161,409 B2

ILLUMINATION APPARATUS AND METHOD FOR OPERATING THE ILLUMINATION APPARATUS IN A DIM MODE

BACKGROUND OF THE INVENTION

The invention relates to an illumination apparatus having at least a first and a second illumination unit, wherein each of the illumination units comprises an LED arrangement and a supply device for supplying the LED arrangement, each of the LED arrangements comprising at least one LED group having a multiplicity of LEDs and the LED groups of the LED arrangements being similar, and having a control device for driving the at least two illumination units with a common nominal dim drive value, the nominal dim drive value driving the illumination units in such a way that the similar LED groups of the illumination units are operated in a dim mode. The invention also relates to a method for operating the illumination apparatus in the dim mode.

DISCUSSION OF THE PRIOR ART

LED illuminations are used in view of weight and of energy consumption as modern alternatives to conventional illumination means, for example incandescent lamps. However, the energy supply of LED illuminations is significantly more complex than the energy supply of incandescent lamps. While incandescent lamps can be dimmed arbitrarily and continuously, LEDs do not respond and start to shine until after a threshold value is exceeded. Above the threshold value, however, brightness control of LEDs by means of the supply voltage is comparatively straightforward to carry out.

Currently, such dimmable LED illuminations are freely available on the market.

SUMMARY OF THE INVENTION

It is an object of the invention to provide an illumination apparatus having LEDs, which exhibits an improved operating behaviour in a dim mode. It is also an object of the invention to provide a method for operating the illumination apparatus.

These objects are achieved by an illumination apparatus having the features of claim 1 and by a method having the features of claim 8. Preferred or advantageous embodiments of the invention may be found in the dependent claims, the following description and the appended figures.

The invention relates to an illumination apparatus which has at least a first and a second illumination unit. Besides the first and second illumination units, further illumination units may also be provided, in particular a multiplicity of illumination units. Particularly preferably, the illumination units are each formed similarly, or with the same design. Besides the illumination units, however, the illumination apparatus may also have further components, and in particular differently configured illumination units.

Each of the illumination units comprises an LED arrangement, each LED arrangement comprising at least one LED group having a multiplicity of LEDs. For example, the LED group may have five, ten or twenty LEDs. Preferably, each LED group has more than three LEDs. Particularly preferably, the LEDs in the LED group are connected in parallel with one another. The LED groups of the various LED arrangements are formed similarly, in particular with the same design. In particular, they have the same number and type of LEDs and the same circuitry.

Furthermore, each of the illumination units comprises a supply device, which is formed for the energy supply of the LED arrangement. As an alternative to this, a separate supply device may also be provided for each LED group of the LED arrangement. In the illumination unit, therefore, at least or precisely one supply device is assigned to each LED arrangement.

The illumination apparatus comprises a control device, which is formed in order to drive the at least two illumination units with a common nominal dim drive value. The control device is formed in particular as a master controller, which simultaneously drives the at least two illumination units. The nominal dim drive value drives the supply devices of the illumination units in such a way that the similar LED groups of the first and second illumination units are operated in a dim mode. If the illumination apparatus comprises only the first and second illumination units, each having an LED group, then both LED groups are activated in the dim mode by the common nominal dim drive value.

The nominal dim drive value may be formed as a digital value, so that a "dim mode on/off" instruction is transmitted, or as a numerical value, so that for example a value 1 or 15 as the nominal dim drive value activates the dim mode.

In the scope of the invention, it is proposed that the illumination apparatus should have an offset device which derives an absolute dim drive value for each of the similar LED groups from the common nominal dim drive value and an individual offset value. The individual offset value is selectively assigned to one of the LED groups, and is selected in such a way that the at least one LED group is activated in the dim mode by the absolute dim drive value. The absolute dim drive value is therefore likewise adapted individually or selectively to the assigned LED group.

In particular, one of the LED groups is assigned a first offset value and a second of the LED groups is assigned a second offset value, the two offset values being different.

The illumination apparatus is therefore distinguished in that an individual offset value is stored for each of the similar LED groups, the multiplicity of offset values being different from one another and the offset values being selected so that they modify the nominal dim drive value of the assigned LED group in such a way that this LED group is activated by the resulting absolute dim drive value.

It is in this case a consideration of the invention that the LEDs and the supply device, i.e. the hardware, exhibit an insufficiently deterministic behaviour at the start of the dim mode, i.e. when there is a minimal luminous power of the LEDs. Thus, it has been observed that in the case of very low dim drive values, some LEDs or LED groups are already activated and some LEDs or LED modules, which are of the same design, still remain deactivated. The effect of this non-uniform behaviour, in the case of spatially distributed LEDs or LED groups, is that it appears to an observer as if the LEDs or LED groups are being switched on successively and not simultaneously. This is also referred to as factory hall effect.

It has furthermore been observed that the brightnesses of the LEDs after switching on differ, so that the appearance is inhomogeneous and therefore unpleasant.

As a remedy, it is proposed in the scope of the invention to store an offset value for each LED group, this value being dimensioned in such a way that if the offset value is taken into account when forming the absolute dim drive value, all the LEDs of the assigned LED group are activated in the dim mode reliably in process terms.

The effect achieved by using offset values tailored individually to the assigned LED group is that a reliable dim mode is ensured with—in physical terms—minimal brightness of the LEDs for simultaneous activation of all the LEDs of the LED groups involved. In this way, on the one hand, the factory hall effect is avoided since all the LEDs are activated simultaneously in the dim mode. On the other hand, the offset value advantageously achieves the effect that all the LEDs of the LED groups involved are operated with the same brightness, or at least approximately similar brightness. These two effects lead to the operating behaviour of the illumination apparatus being significantly improved in the dim mode.

In a preferred configuration of the invention, the nominal dim drive value and the offset value are selected in such a way that at least one of the similar LED groups is deactivated during operation with a neutral offset value, for example an offset value of 0, in the dim mode with the nominal dim drive value. The nominal dim drive value is therefore preferably selected to be smaller than the absolute dim drive value actually required. This configuration underlines the inventive concept of selecting the nominal dim drive value and the offset value in such a way that each of the LED groups must be assigned an offset value greater than 0 in order to activate the LEDs of the LED group reliably in process terms and fully.

In a preferred configuration of the invention, each of the LED groups exclusively comprises similar LEDs of one LED colour. In particular, each of the LED groups is limited to one LED colour. LEDs have a threshold value which is dependent on the emitted colour. In order to be able to keep the absolute dim drive value as low as possible, it is preferred for only similar LEDs to be arranged in one of the LED groups.

In a refinement of the invention, however, each of the LED arrangements may comprise at least one first and one second LED group, the LED groups respectively having similar LEDs of one colour, and the colour of the first LED group being different from the colour of the second LED group. In this refinement, a first offset value for each of the first LED groups and a second offset value for each of the second LED groups is stored in the offset device. If a nominal dim drive value is then selected, which is used in order to drive the first LED group, then the first nominal dim drive value is supplemented with the first offset value and the first LED group is activated. If a second nominal dim drive value is used in order to drive the second LED group, then this is supplemented by the second offset value and the second LED group is activated. It is therefore possible selectively to activate the first LED groups having the first colour with minimal dimming or the second LED groups having the second colour likewise with minimal dimming, it respectively being ensured during the activation that all the LEDs of the first colour or of the second colour are activated.

In a preferred refinement of the invention, the LED arrangements respectively comprise a white LED group having white LEDs, a red LED group having red LEDs, a green LED group having green LEDs and a blue LED group having blue LEDs. In this refinement, all the white, red, green or blue LED groups can therefore be operated with minimal brightness in a dim mode.

In a preferred configuration of the invention, the supply device is formed as a PWM power supply unit, that is to say a power supply unit which controls the supply by means of pulse width modulation. With this type of supply device, particularly at very low powers, owing to the signal waveforms used, variations which are constant in operation but analytically unpredictable occur. These variations are compensated for by using the individual offset values, so that they compensate for the variations not only in the LED arrangement but in the illumination unit.

In a particularly preferred configuration of the invention, the illumination apparatus is formed as aircraft interior illumination. In this configuration, the advantages of the invention are manifested particularly well since, in order for the passengers to feel safe, it is important for example that, when the aircraft interior illumination is switched on, it is not activated unreliably and successively with the factory hall effect, but instead is activated as a whole.

The invention also relates to a method for operating the illumination apparatus as described above or according to one of claims 1 to 7, wherein the control device drives the at least two illumination units with a common nominal dim drive value, each of the illumination units deriving the absolute dim drive value from the nominal dim drive value and the offset value by means of the offset device and transmitting it to the supply device, so that the similar LED groups are operated in dim mode and all the LEDs of the similar LED groups are activated simultaneously.

In a preferred refinement of the invention, the offset value is determined on the basis of a measurement. In this case, the behaviour of the multiplicity of LEDs of one of the LED groups in the illumination unit is metrologically recorded. By this procedure, both the behaviour of the LEDs in the LED group and the behaviour of the assigned supply device in the illumination unit are therefore taken into account. The common dim drive value, in particular the minimal dim drive value, is measured, the measured dim drive value being the smallest dim drive value with which all the LEDs of the LED group are activated. The offset value is determined from this common dim drive value. Preferably, the offset is determined in such a way that the derivation of the absolute dim drive value leads at least or exactly to the common dim drive value as a result.

Particularly preferably, the metrological recording is carried out by a camera, the dim drive value being increased constantly and the current dim drive value forming the common dim drive value, with which all the LEDs of the LED group are activated, the status of the LEDs being monitored by the camera.

BRIEF DESCRIPTION OF THE DRAWINGS

Other features, advantages and effects of the invention may be found in the following description of preferred exemplary embodiments of the invention.

DETAILED DESCRIPTION OF THE INVENTION

Parts and values which are the same, or correspond to one another, are provided with identical or corresponding references.

Figure 1:
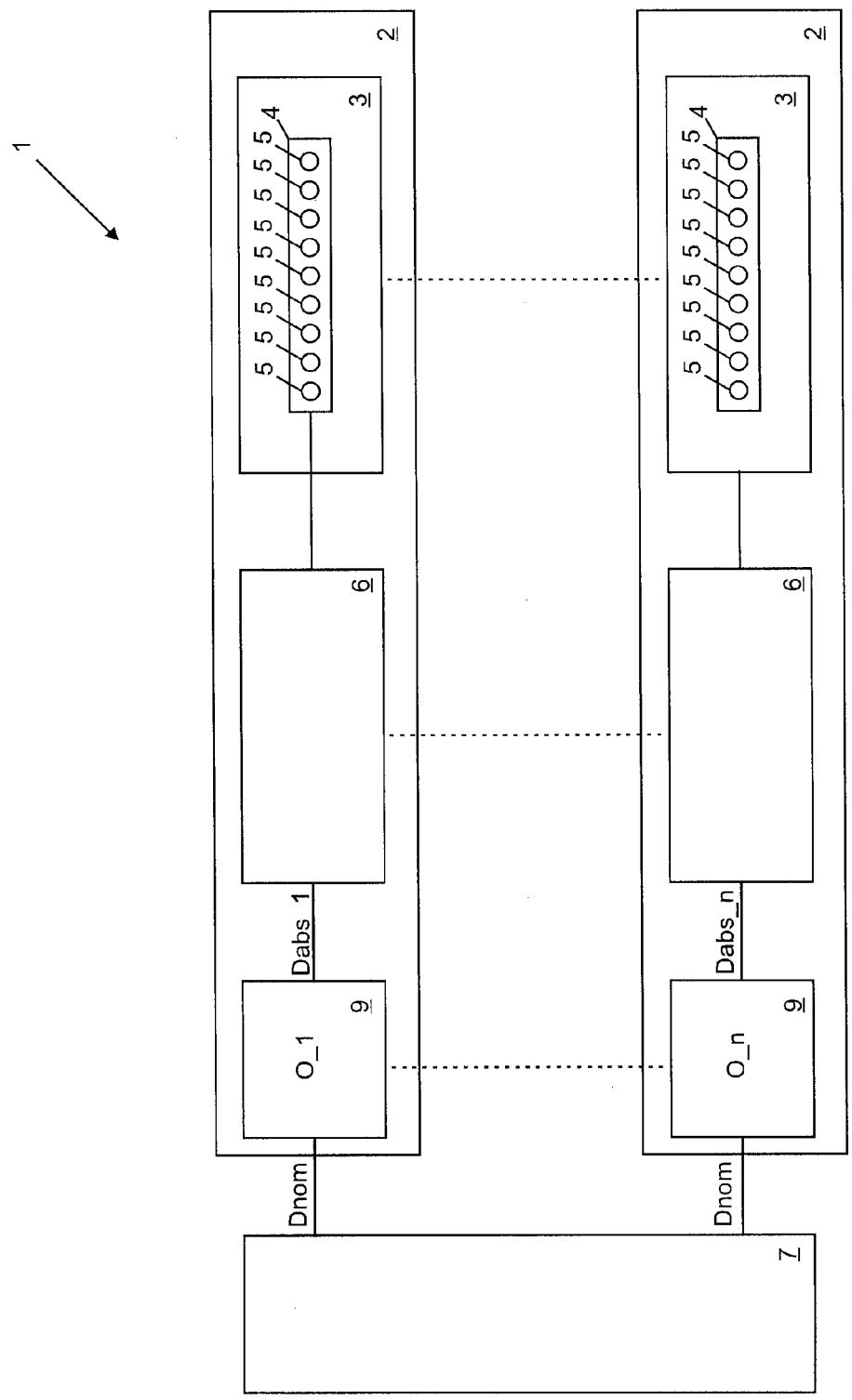
FIG. 1 shows a schematic block diagram of an illumination apparatus as a first exemplary embodiment of the invention.

FIG. 1 shows, in a schematic block representation, an illumination apparatus 1 which is formed as aircraft interior illumination. The illumination apparatus 1 comprises a multiplicity of n illumination units 2, each illumination unit 2 being assigned an LED arrangement 3 having at least one LED group 4, which comprises a plurality of individual LEDs 5. Furthermore, each illumination unit 2 comprises a supply device 6, which constitutes the energy supply of the LED arrangement 3.

The LED arrangements 3 are, for example, distributed in the aircraft interior and are used to illuminate the passenger cabin. All the LEDs 5 of one of the LED groups 4 are of the same design and/or have the same colour. In the illumination apparatus 1 shown in FIG. 1, all the LED groups 4 are formed with the same design as one another.

The illumination apparatus 1 comprises a control device 7, which sends a nominal dim drive value Dnom to the illumination units 2. The nominal dim drive value Dnom may on the one hand be a numerical control value, for example 1, or a digital instruction. By the nominal dim drive value Dnom, the illumination unit 2 is instructed that the LED group 4 should enter the dim mode.

Dim mode is intended to mean activation of the LEDs 5 of the LED group 4 with minimal brightness, but with all the LEDs 5 of the LED group 4 being activated.

It has been found that the electronics in the structural units 2, in particular the supply devices 6, and the LEDs 5 of the LED groups 4, are subject to variations in the dim mode as a result of components and production.

Figure 5:
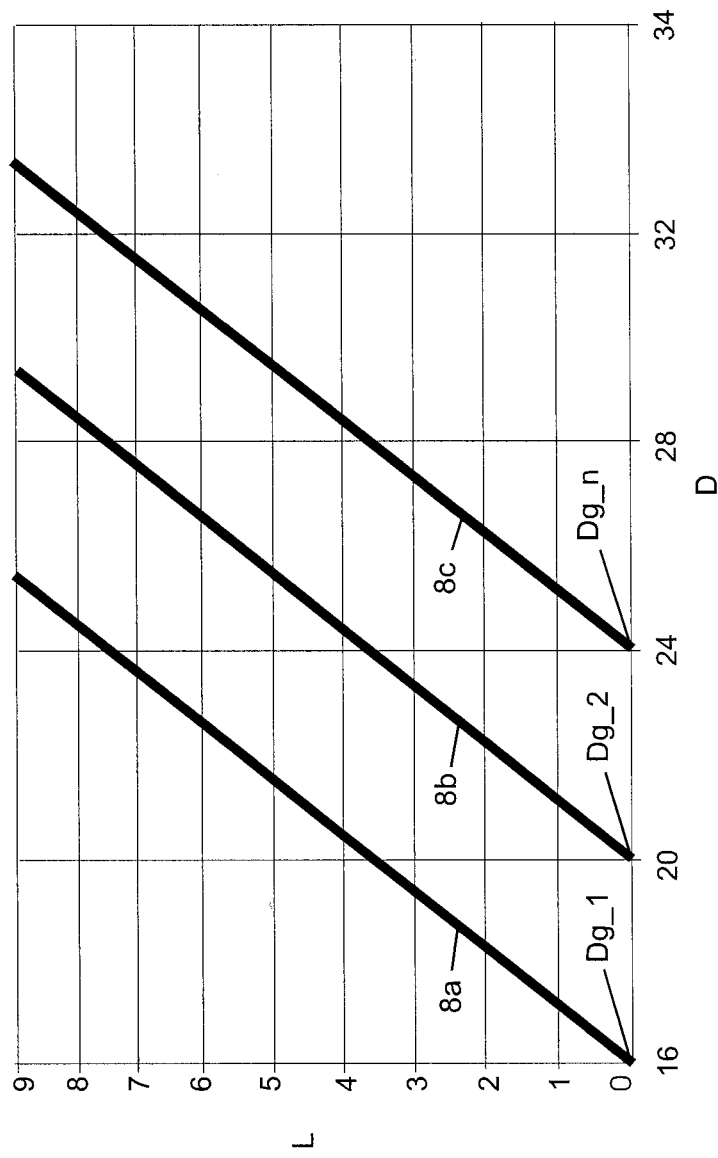
FIG. 5 shows a graph to explain the method for determining the offset value.

FIG. 5 shows a schematic diagram, a dim drive value D for the supply device 6 being plotted in arbitrary units on the X axis and a brightness L being plotted on the Y axis. In the graph, by way of example, three characteristic curves 8a,b,c are plotted, which are assigned to three LED groups 4 of the same design and their supply devices 6. As can be seen from the graphs 8a,b,c, a first LED group 4 already begins to shine at a common dim drive value Dg_1 of 16, the second begins to shine at a common dim drive value Dg_2 of 20 and the third LED group 4 begins to shine at a common dim drive value Dg_n of 24. The common dim drive value Dg is intended to mean the minimum dim drive value D with which all the LEDs 5 of the assigned LED group 4 shine together.

If the LED groups 4 in FIG. 1 are now driven with a value of 18 as Dnom, for example, then one of the LED groups 4 will shine but the other LED groups 4 will remain deactivated. During operation, for example in the aircraft interior when activating the dim mode, this would mean that only some of the illumination units 2 will initially shine and the others will not start to shine as well until higher brightnesses. This effect is also known as the factory hall effect, and it leads to uneven illumination in the aircraft interior.

In order to avoid this effect, the illumination apparatus 1 has an offset device 9, which is formed in order to convert the nominal dim drive value Dnom with an offset value O_1 . . . O_n into an absolute dim drive value Dabs_1 . . . Dabs_n, the absolute dim drive value Dabs_1 . . . Dabs_n being formed individually per LED group and being selected in such a way that the assigned LED group 4 is activated by the absolute dim drive value Dabs_1 . . . Dabs_n.

In a first alternative, the nominal dim drive value Dnom is sent as a digital instruction, the offset device 9 interpreting this instruction and sending the respective common dim drive value Dg as the absolute dim drive value Dabs_1 . . . Dabs_n for the LED groups 4, that is to say, for example, it sends the value 16 for the LED group 4 of the curve 8a, the value 20 for the LED group 4 of the curve 8b and the value 24 for the LED group 4 of the curve 8c.

In a second alternative, a value less than the smallest common dim drive value, for example 14, is sent as the nominal dim drive value Dnom, so that the offset value for the curve 8a is 2, the offset value for the curve 8b is 6 and the offset value for the curve 8c is 10. The absolute dim drive value Dabs is therefore calculated by addition of the nominal dim drive value plus the offset value.

Figure 2:
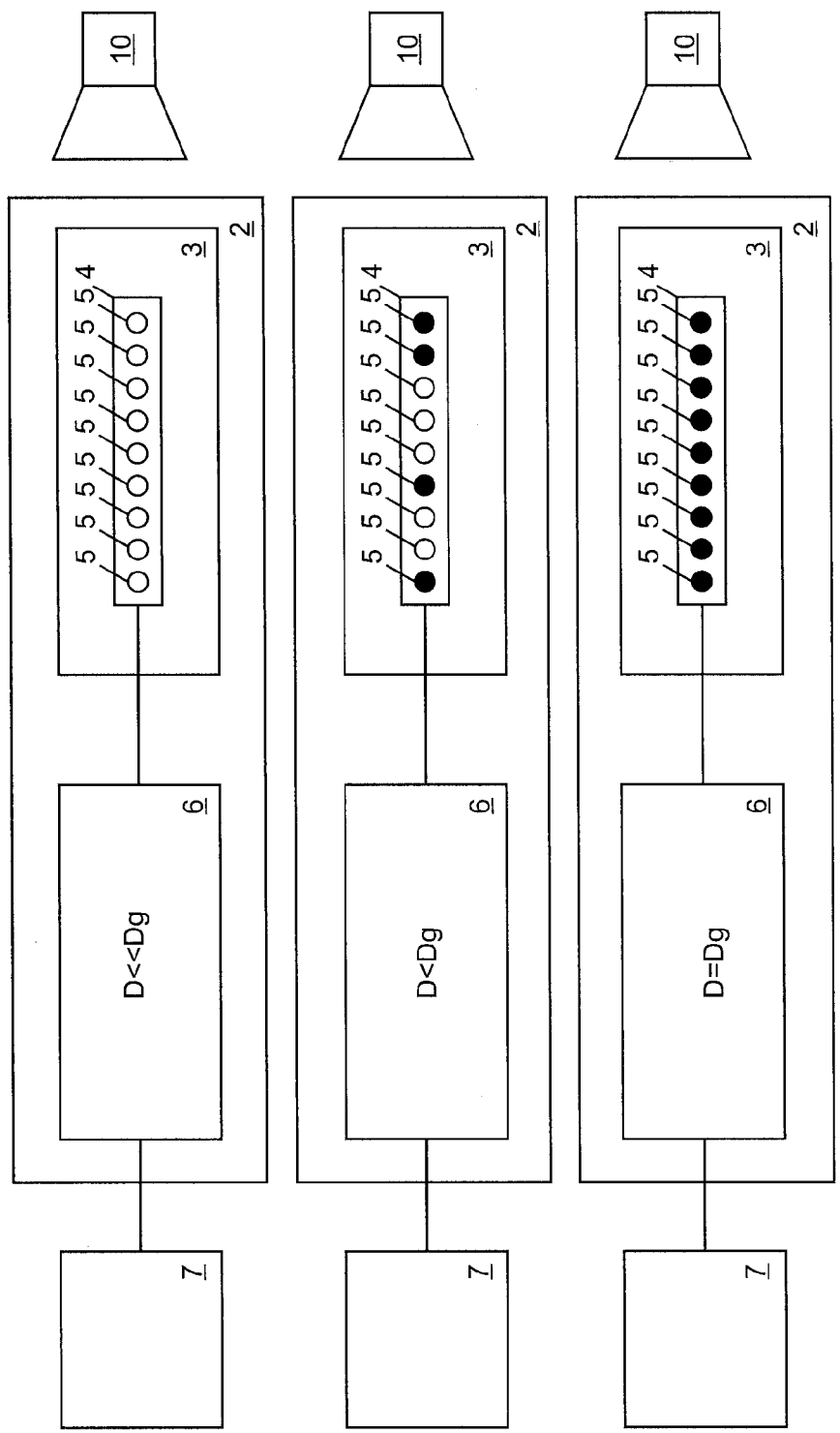
FIGS. 2a,b,c show a schematic illustration to explain the method for determining the offset values for the illumination apparatus in FIG. 1, in the same representation as FIG. 1.

The determination of the offset value, or of the common dim drive value Dg, will be disclosed in connection with FIGS. 2a,b,c. These figures respectively show an illumination unit 2 having an assigned supply device 6, the offset device 9 having been deactivated or omitted. A camera 10, the field of view of which covers the LED group 4, is arranged on the right-hand side. In the scope of a first measurement, the drive value D of the supply device 6 is increased constantly until all the LEDs 5 of the LED group 4 shine.

In FIG. 2a the LEDs 5 are represented as being deactivated, in FIG. 2b four of the total of nine LEDs are already shining, and in FIG. 2c all the LEDs 5 are shining, the dim drive value D in FIG. 2c corresponding to the common dim drive value Dg.

By this measurement method, the illumination units 2 comprising the LED groups 4 and the supply device 6 can be measured after manufacture, and the offset value O_1, O_n can be stored as a correction value for any hardware tolerances and LED tolerances, and used during operation as explained in FIG. 1.

Figure 3:
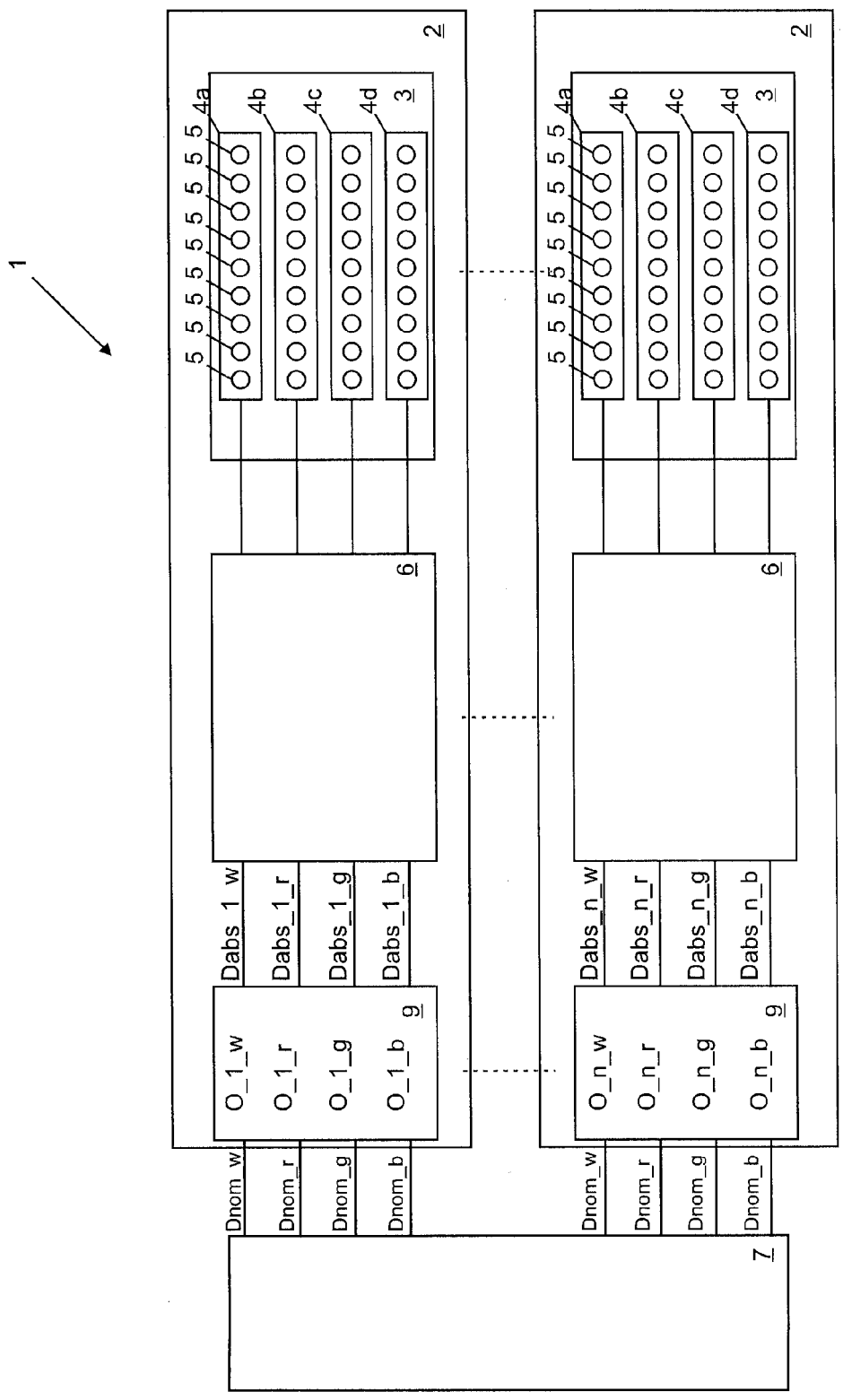
FIG. 3 shows an illumination apparatus as a second exemplary embodiment of the invention in the same representation as FIG. 1.

FIG. 3 shows an illumination apparatus 1 as a second exemplary embodiment of the invention. The illumination apparatus 1 comprises four LED groups 4a,b,c,d in each LED arrangement 3, a first LED group 4a having only white LEDs 5, a second LED group 4b having only red LEDs 5, a third LED group 4c having only green LEDs 5, and a fourth LED group 4d having only blue LEDs 5. In order to supply the LED groups 4a-d, they are connected via four parallel lines to the supply device 6, so that the supply voltage and/or current can be adjusted individually per LED group.

For the dim mode, the control device 7 sends each illumination unit 2 four nominal dim drive values Dnom_w, Dnom_r, Dnom_g and Dnom_b, which are assigned according to the indices to the four LED groups 4a-d. In the offset device 9, for each LED arrangement 3, or illumination unit 2, and for each LED group 4a-d, a selective offset value O_1_w, O_1_r, O_1_g and O_1_b, or for each further $n^{th}$ LED arrangement 3 or $n^{th}$ illumination unit 2 O_n_w, O_n_r, O_n_g and O_n_b, is stored, the offset device 9 generating an absolute dim drive value Dabs_1_w, Dabs_1_r, Dabs_1_g and Dabs_1_b, or Dabs_n_w, Dabs_n_r, Dabs_n_g and Dabs_n_b, on the basis of the nominal dim drive values and the stored offset values, and sending it to the supply device 6 so that the four LED groups 4 of all n LED arrangements 3, or n illumination units 2, are activated reliably in process terms. If, for example, the input Dnom_w is therefore sent to all the illumination units 2, then the LED groups 4a of all n illumination units 2 will be brought into the dim mode simultaneously and reliably in process terms.

Figure 4:
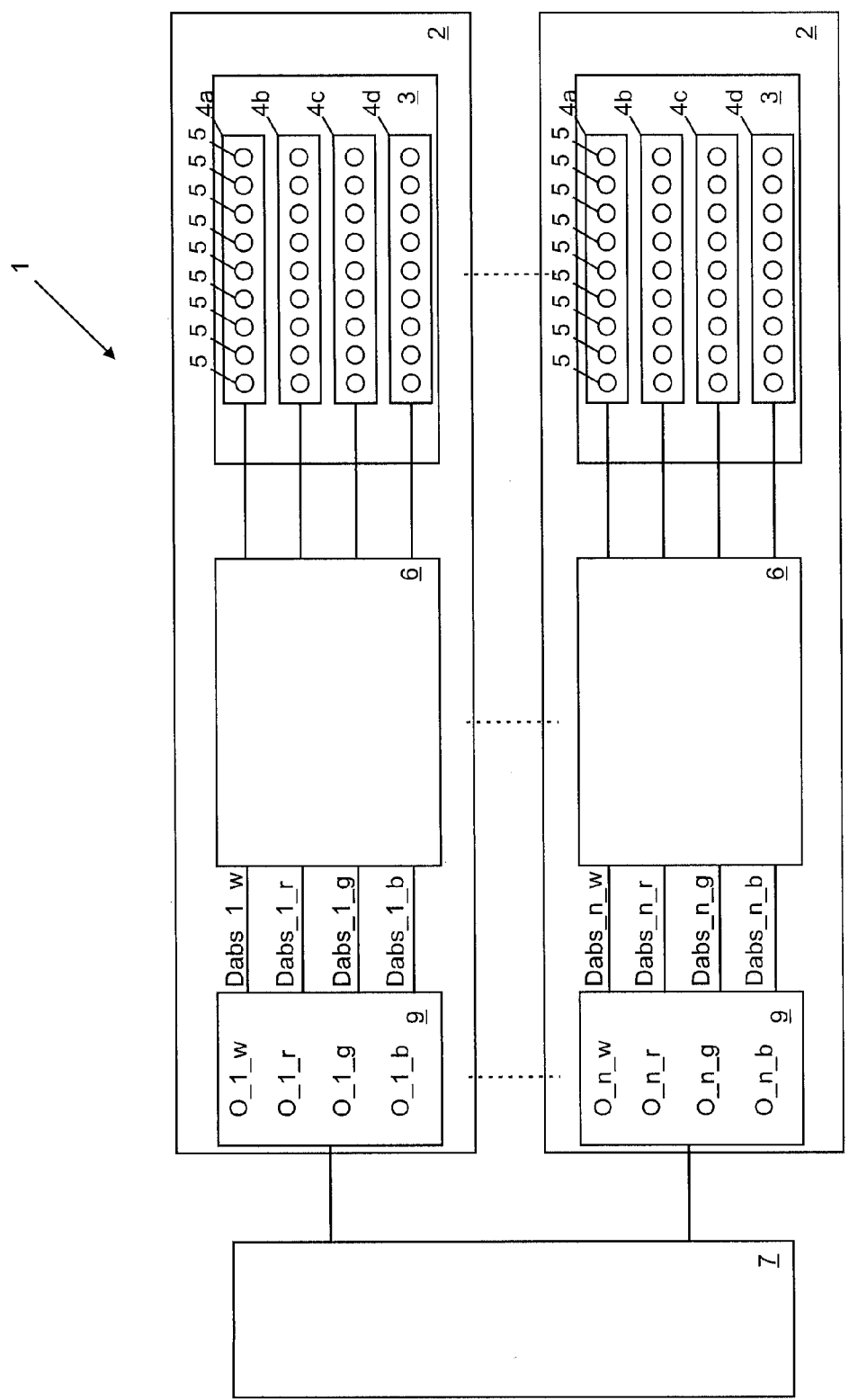
FIG. 4 shows a variant of the second exemplary embodiment of the invention in the same representation as FIG. 3.

FIG. 4 represents a variant of the exemplary embodiment in FIG. 3, wherein only one brightness value and one colour value are sent instead of individual nominal dim drive values Dnom, the offset device 9 being formed in order to generate four absolute dim drive values Dabs_1_w, Dabs_1_r, Dabs_1_g and Dabs_1_b on the basis of these two parameters and the stored offset values O_1_w, O_1_r, O_1_g and O_1_b, which allows reliable switching on of the four LED groups 4a-d in process terms.

The repair friendliness of the illumination apparatus 1 is particularly to be emphasised, since in the event of a problem in the illumination unit 2 the defective illumination unit 2 can straightforwardly be replaced and a new illumination unit 2 can be used without further calibration since the necessary offset values O are stored in the illumination unit 2.

LIST OF REFERENCES 1 illumination apparatus
2 illumination unit
3 LED arrangement
4 LED group
5 individual LED
6 supply device
7 control device
8 characteristic curve
9 offset device
10 camera

What is claimed is:

1. An illumination apparatus, comprising:
   at least a first illumination unit and a second illumination unit, wherein each of the illumination units comprises an LED arrangement and a supply device for supplying the LED arrangement, each of the LED arrangements comprising at least one LED group having a multiplicity of LEDs and the LED groups of the LED arrangements being similar,
   a control device for driving the at least two illumination units with a common nominal dim drive value, the nominal dim drive value driving the illumination units in such a way that the similar LED groups of the illumination units are operated in a dim mode, and
   an offset device, the offset device being formed in order to derive an absolute dim drive value for each of the similar LED groups from the nominal dim drive value with an offset value, the offset value being selectively assigned to the LED group and being selected in such a way that the LED group is activated by the absolute dim drive value.

2. The illumination apparatus according to claim 1, wherein at least one of the LED groups is deactivated during operation with a neutral offset value.

3. The illumination apparatus according to claim 1, wherein the LED group comprises similar LEDs of one LED colour.

4. The illumination apparatus according to claim 3, wherein the LED arrangements respectively comprise at least one first and one second LED group, the LED groups respectively comprising similar LEDs of one colour, and the colour of the first LED group being different from the colour of the second LED group, the offset device having a first offset value for each of the first LED groups and a second offset value for each of the second LED groups.

5. The illumination apparatus according to claim 3, wherein the illumination units respectively comprise a white LED group having white LEDs, a red LED group having red LEDs, a green LED group having green LEDs and a blue LED group having blue LEDs.

6. The illumination apparatus according to claim 1, wherein the supply device is formed as a PWM power supply unit.

7. The illumination apparatus according to claim 1, wherein the illumination apparatus is formed as aircraft interior illumination.

8. A method for operating the illumination apparatus according to claim 1, wherein the control device drives the at least two illumination units with a nominal dim drive value, each of the illumination units deriving the absolute dim drive value from the nominal dim drive value and the offset value and transmitting it to the supply device, so that the similar LED groups are operated in a dim mode.

9. The method according to claim 8, wherein a common dim drive value of one of the LED groups in the illumination unit is metrologically recorded, and the offset value of the LED group is determined from the common dim drive value, the common dim drive value being the smallest dim drive value with which all the LEDs of the LED group are activated.

10. The method according to claim 9, wherein the metrological recording is carried out by a camera.

* * * * *